(12) United States Patent
Eckrich et al.

(10) Patent No.: US 10,809,093 B2
(45) Date of Patent: Oct. 20, 2020

(54) ROTATION ANGLE SENSOR SYSTEM WITH VARIABLE MEASUREMENT ANGLE RANGE

(71) Applicant: Continental Teves AG & Co. oHG, Frankfurt (DE)

(72) Inventors: Jörg Eckrich, Wiesbaden (DE); Stephan Brüggemann, Frankfurt am Main (DE); Jochen Zachow, Glashütten (DE)

(73) Assignee: Continental Teves AG & Co. oHG (DE)

( * ) Notice: Subject to any disclaimer, the term of this patent is extended or adjusted under 35 U.S.C. 154(b) by 315 days.

(21) Appl. No.: 15/757,441

(22) PCT Filed: Jul. 29, 2016

(86) PCT No.: PCT/EP2016/068198
§ 371 (c)(1),
(2) Date: Mar. 5, 2018

(87) PCT Pub. No.: WO2017/041959
PCT Pub. Date: Mar. 16, 2017

(65) Prior Publication Data
US 2018/0252552 A1 Sep. 6, 2018

(30) Foreign Application Priority Data

Sep. 7, 2015 (DE) .......... 10 2015 217 080
Feb. 5, 2016 (DE) .......... 10 2016 201 783

(51) Int. Cl.
*G01D 5/12* (2006.01)
*G01D 5/244* (2006.01)
*G01D 5/14* (2006.01)

(52) U.S. Cl.
CPC .......... *G01D 5/12* (2013.01); *G01D 5/145* (2013.01); *G01D 5/244* (2013.01)

(58) Field of Classification Search
CPC .......... G01D 5/12; G01D 5/145; G01D 5/244
See application file for complete search history.

(56) References Cited

U.S. PATENT DOCUMENTS

| 6,861,837 B1 | 3/2005 | Shimizu et al. |
| 8,618,792 B2 * | 12/2013 | Kojima .......... G01D 5/244 324/167 |
| 2005/0030011 A1 | 2/2005 | Shimizu et al. |

FOREIGN PATENT DOCUMENTS

| CN | 102171535 A | 8/2011 |
| DE | 3711062 A1 | 10/1988 |

(Continued)

OTHER PUBLICATIONS

Korean Notification of Reason for Refusal for Korean Application No. 10-2018-7006557, dated Jan. 15, 2019, with translation, 9 pages.

(Continued)

*Primary Examiner* — Manuel L Barbee
(74) *Attorney, Agent, or Firm* — RatnerPrestia (57) ABSTRACT

A rotational angle sensor system including: a rotatably mounted movement sensor; a sensor that is designed to detect a rotation of the movement sensor, wherein the rotation occurs at a measurement angle interval; an evaluation electronics system designed to receive an analogue signal from the sensor and to digitalise same using an internal resolution, and to emit a digital output signal reporting the rotation detected by the sensor, wherein the resolution of the digital output signal for a measurement angle interval of less than or equal to 360° is the same size as the internal resolution.

18 Claims, 6 Drawing Sheets

(56) References Cited

FOREIGN PATENT DOCUMENTS

| | | | | |
|---|---|---|---|---|
| DE | 4413496 C1 | 9/1995 | | |
| DE | 19652988 A1 | 6/1998 | | |
| DE | 19703525 A1 | 8/1998 | | |
| DE | 19822843 A1 | 11/1999 | | |
| DE | 10115093 A1 | 10/2002 | | |
| DE | 102004028855 A1 | 1/2005 | | |
| DE | 10339963 A1 * | 4/2005 | ............ | H01C 10/32 |
| DE | 10339963 A1 | 4/2005 | | |
| DE | 202005018989 U1 | 4/2007 | | |
| DE | 102014100624 A1 | 7/2015 | | |
| EP | 0856721 A1 | 8/1998 | | |
| JP | 2005003625 A | 1/2005 | | |
| WO | 2010041111 A2 | 4/2010 | | |

OTHER PUBLICATIONS

International Search Report and Written Opinion for International Application No. PCT/EP2016/068198, dated Nov. 29, 2016, 8 pages.
German Search Report for German Application No. 10 2016 201 783.7, dated Sep. 29, 2016, including partial English translation, 8 pages.
Chinese Office Action for Chinese Application No. 201680051920.3, dated Sep. 12, 2019, with translation, 16 pages.

* cited by examiner

Prior Art

ROTATION ANGLE SENSOR SYSTEM WITH VARIABLE MEASUREMENT ANGLE RANGE

CROSS REFERENCE TO RELATED APPLICATIONS

This application is the U.S. National Phase Application of PCT International Application No. PCT/EP2016/068198, filed Jul. 29, 2016, which claims priority to German Patent Application No. 10 2015 217 080.2, filed Sep. 7, 2015 and German Patent Application No. 10 2016 201 783.7, filed Feb. 5, 2016, the contents of such applications being incorporated by reference herein.

FIELD OF THE INVENTION

The invention relates to a rotation angle sensor system.

BACKGROUND OF THE INVENTION

Rotation angle sensor systems based on the prior art are frequently used in vehicles with active suspension control, level adjustment or automatic headlamp adjustment. In this case, the housing of the sensor is mounted permanently on the chassis of the vehicle and the wheel or the wheel suspension is coupled to a motion sensor of the rotation angle sensor system via a rod assembly. In this way, it is possible for the inward and outward travel of the wheel relative to the chassis to be picked up.

Rotating with the motion sensor is, by way of example, a magnetic encoder whose angular position is picked up by a Hall element or another sensor. The inward and outward travel of the wheel is thus converted into a measurable rotary motion of the motion sensor.

In this case, the rotation takes place in a bounded angle interval that is, by way of example, between −45° and +45° around a zero point. The zero point then corresponds for the most part to the natural deflection if the vehicle is on a horizontal plane.

Using evaluation electronics, for example in the form of a microcontroller, an initially digital output signal is generated from the sensed angular position. From this, an analog or digital or pulse-width-modulated signal is then generated, the resolution of the digital output signal being reduced to $2^{12}$ bits, that is to say 4096 smallest units (digits). The output signal, for example a voltage, is then transmitted to an electrical controller. On account of the high level of incident electromagnetic radiation and the long cable runs in many vehicles, a higher resolution would lead to impairment of the data in the case of conventional interfaces.

Since, on the one hand, the resolution of the output signal is therefore limited, but on the other hand also only a limited angle range is supposed to be measured, an electrical output signal having recurring intervals is used. If the chosen measurement angle interval is 90°, then the output signal is divided into intervals of 90°, four of which map a rotation angle of 360°.

Figure 1A:
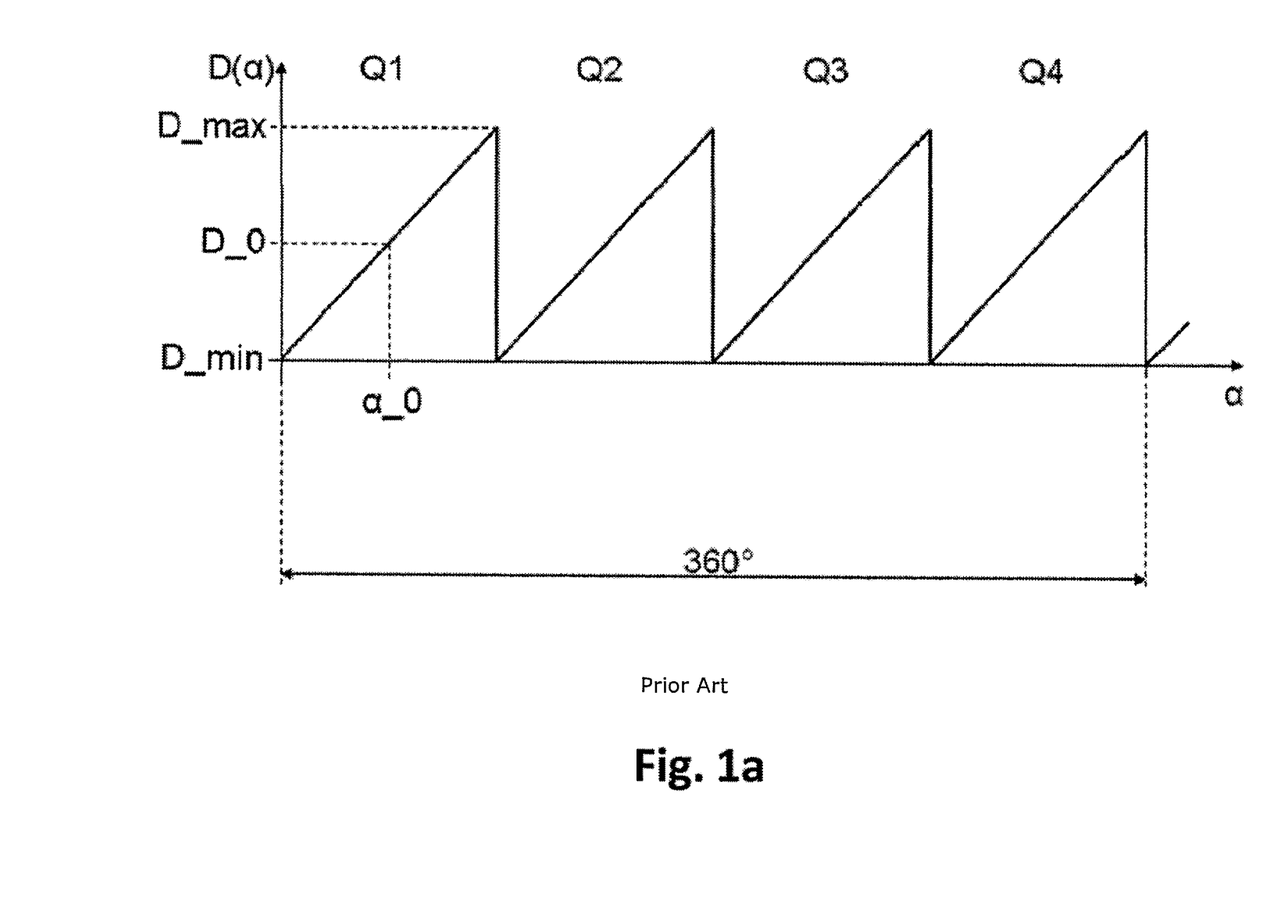

FIG. 1a shows a graph of such an output signal $D(\alpha)$ with 90° intervals Q1, Q2, Q3, Q4. The rotation angle $\alpha$ is plotted on the abscissa, and the ordinate indicates the magnitude of the output signal $D(\alpha)$. The depicted output signal $D(\alpha)$ has a sawtooth-shaped profile and thus divides an angle range of 360° into four intervals of equal magnitude that are bounded by discontinuities. Along a positive rotation angle change, the output signal $D(\alpha)$ jumps from a maximum output signal value D_max to a minimum output signal value D_min at these discontinuities. In this case, the measurement angle interval extends only to the first interval Q1, whereas the intervals Q2, Q3 and Q4 are not part of the design range of the rotation angle sensor system. The zero position angle $\alpha\_0$ with the associated output signal value D_0 is defined as a zero position at which the vehicle is on a horizontal plane.

In generating the digital output signal $D(\alpha)$, a volume of data of $2^{14}$ bits over an angle of 360° was used in this example, corresponding to a volume of data of $2^{12}$ bits over an angle of 90° for the same resolution.

Since the output of the output signal $D(\alpha)$ is limited to a volume of data of $2^{12}$ bits, the most that can be used as the measurement angle interval for the resolution of the output signal $D(\alpha)$ with the internal resolution value is an angle of 90°, as is the case in this example. Although any smaller angle would result in a better resolution of the output signal $D(\alpha)$ that is output, it would be infeasible for many applications.

Figure 1B:
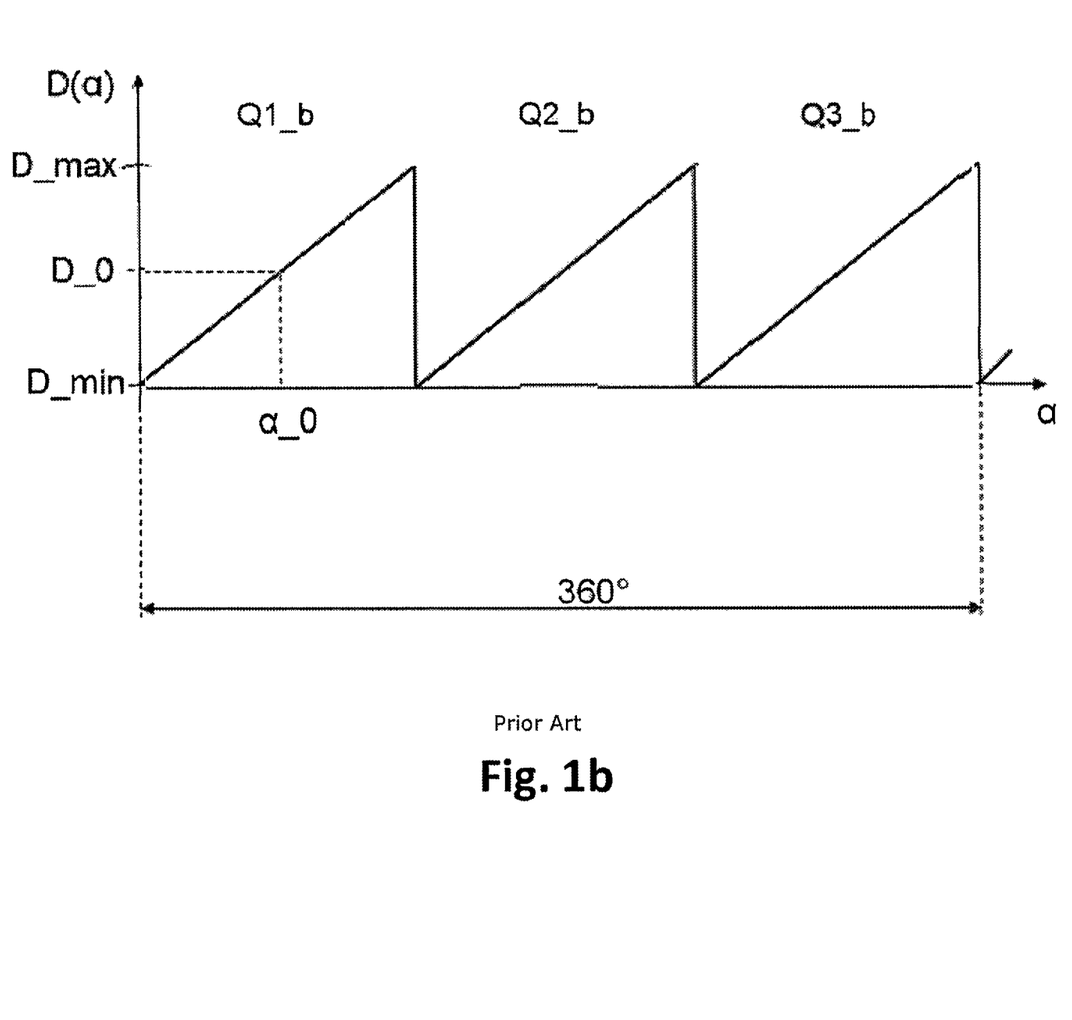

The case of a larger measurement angle interval is shown by FIG. 1b in a graph of analogous structure to FIG. 1a. The output signal $D(\alpha)$ is divided into three intervals Q1_b, Q2_b and Q3_b that each comprise a rotation angle range of 120°. The measurement angle interval again extends only to the first interval Q1_b. Since the available volume of data for the output signal $D(\alpha)$ is only $2^{12}$ bits, the resolution of said output signal is lower than the internal resolution at which a smaller angle, namely 90°, with a volume of data of $2^{12}$ bits was able to be depicted.

Expressed another way, if the internal resolution were retained then a data volume of $2^{14}/3$ bits=5462 bits would be necessary for the interval of 120°. However, only $2^{12}$=4096 bits are available, which is why the resolution of the output signal $D(\alpha)$ is worse than the internal resolution in this example.

The output signal profiles of a rotation angle sensor system based on the prior art that are shown in FIG. 1a and FIG. 1b are at least approximately matched to the restricted resolution that is prescribed by the interface between the evaluation electronics and the electrical controller. This is not particularly effective, however, since the internal resolution is higher during digitisation of the analogue sensor signal that is produced during angle measurement. If the limitation to a single interval reduces the volume of data when the output signal $D(\alpha)$ is generated, a portion of this internal resolution is thus wasted.

The volume of data does not have to be reduced only if, as in the example of FIG. 1a, the measurement angle interval is chosen to be so small that this is not necessary. However, besides restricted usability of the rotation angle sensor system, a small measurement angle interval results in it easily being possible for the interval to be undesirably exceeded, for example in the event of a stone hitting or wear on the vehicle, if the inward or outward travel of the wheel is particularly great.

Furthermore, the effect of the limitation of the measurement angle interval, shown in FIGS. 1a and 1b for 90° and 120°, respectively, is that the rotation angle sensor system is limited to a quite specific installation position. The measurement angle interval would comprise a discontinuity in the event of a shift to the right or left along the output signal graph. If the discontinuity were exceeded, however, the output signal $D(\alpha)$ would be interpreted incorrectly by the electrical controller. The controller would be able to distinguish neither different intervals nor the discontinuities thereof.

SUMMARY OF THE INVENTION

Therefore an aspect of the invention aims to provide a rotation angle sensor system that eliminates the cited disadvantages and is simple and effective in its operation.

As a result of an aspect of the invention involving the resolution of the digital output signal for a measurement angle interval less than or equal to 360° being of the same magnitude as the internal resolution, the advantage is obtained that the internally available resolution can be utilised fully without limiting the measurement angle interval.

According to one development of the invention, the digital output signal in a maximum angle interval from 0° to 360° depicts a unique mapping of the rotation of the motion sensor. Instead of the division into multiple intervals Q1 to Q4 and Q1_b to Q3_b, as depicted in FIGS. 1a and 1b, a single interval, the maximum angle interval, comprises a full revolution and ensures uncomplicated further use of the output signal, for example in a controller.

In the event of sharp deflections, such as may arise as a result of wear on or a stone hitting the vehicle, the measurement angle interval can be exceeded. In this case, the unique mapping ensures that there can be no incorrectly interpreted output signal in the maximum angle interval.

Preferably, the measurement angle interval is within the maximum angle interval. As a result of the uniqueness, every value of the output signal within the maximum angle interval has exactly one particular associated rotation angle of the motion sensor. The measurement angle interval within the maximum angle interval can thus comprise up to 360° without an ambiguous output signal being produced. In addition, shifting the peripheral bounds of the measurement angle interval or altering the zero position angle is also unproblematic. This allows the rotation angle sensor system to be used more flexibly, since the installation position can be chosen freely.

According to a further advantageous embodiment of the rotation angle sensor system 1 according to the invention, the output signal covers a signal range between a signal minimum and a signal maximum and, as defined by a discontinuity, skips to the signal minimum when a rotation angle associated with the signal maximum is exceeded and skips to the signal maximum when a rotation angle associated with the signal minimum is undershot. In this way, the rotation angle sensor system 1 is operable even if the motion sensor completes more than one full revolution.

Preferably, the maximum angle interval has one discontinuity at each of its edges only. This is useful in order to easily provide a unique output signal in the maximum angle interval by utilising the whole signal width.

According to a further embodiment of the rotation angle sensor system 1 according to the invention, the maximum angle interval has exactly one discontinuity in the area between its edges.

Preferably, the measurement angle interval is within an area without a discontinuity. This simplifies the evaluation, for example by a controller.

According to a further embodiment of the rotation angle sensor system 1 according to the invention, the measurement angle interval is within an area that includes the discontinuity. In order to be able to use the output signal further, a controller needs in this case to be capable of detecting the discontinuity, or of interpreting the output signal unambiguously in the area of said discontinuity.

The rotation angle sensor system is expediently configured such that the measurement angle interval comprises the middle of the maximum angle interval, in particular is in the middle of the maximum angle interval. In the event of sharp deflections, such as may arise as a result of wear on or a stone hitting the vehicle, the measurement angle interval can be exceeded. As a result of a measurement angle interval in the middle, the distance from the edges of the maximum angle interval is great on both sides of the measurement angle interval, which means that there can be no incorrectly interpreted output signal.

Preferably, the internal resolution is at least $2^{10}$ bits, advantageously $2^{12}$ bits, preferably $2^{14}$ bits over an angle of 360°.

It is preferred for the measurement angle interval to comprise an angle range of 90°, advantageously 120°, preferably 180°. Such a measurement angle interval is useful for standard rotation angle sensor tasks on a vehicle.

It is expedient for the rotation angle sensor system to have a bracket, wherein the bracket permits mounting of the rotation angle sensor system in different alignments and/or positions on a vehicle.

Figure 5:
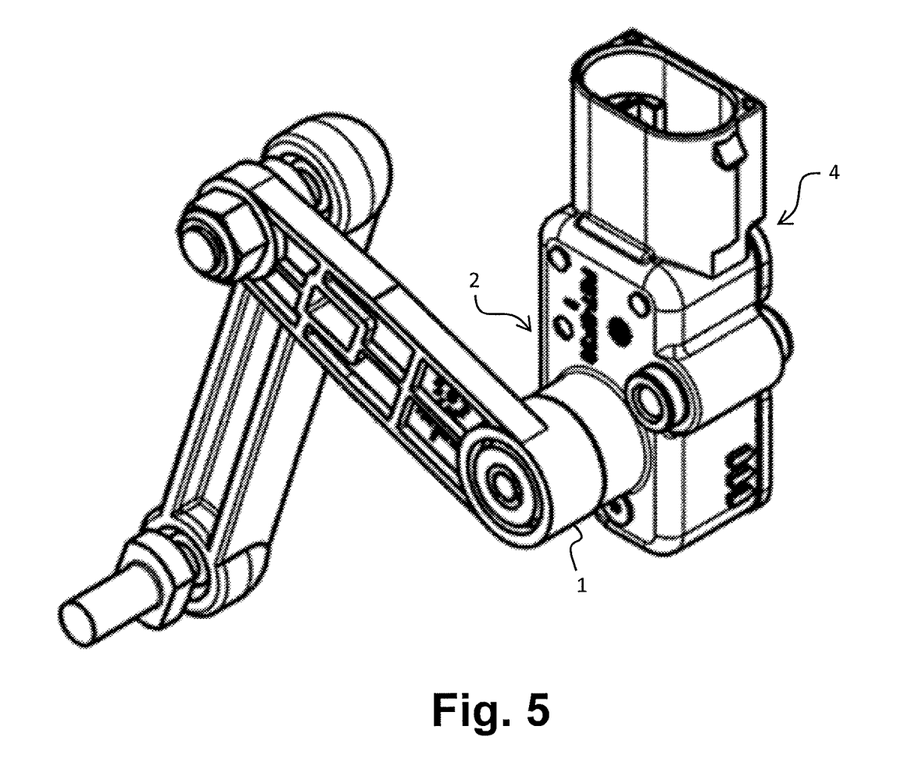
FIG. 5 shows an exemplary rotatably mounted motion sensor.
Figure 6:
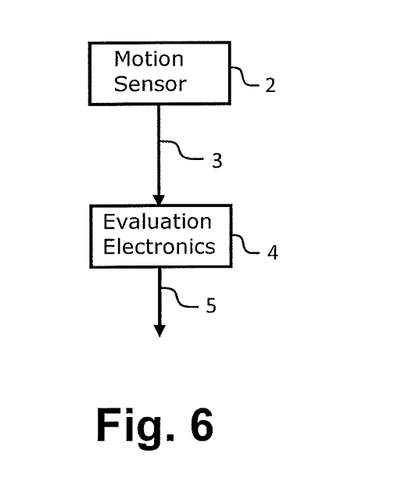
FIG. 6 shows a block diagram of signal flow of an exemplary motion sensor system.

Referring to FIGS. 5 and 6, according to a further aspect of the invention, the object is achieved by a method for calibrating a rotation angle sensor system 1, comprising the method steps of deflecting the motion sensor 2 through a defined first angle picking up and storing a first sensor signal 3 deflecting the motion sensor 1 through a defined second angle picking up and storing a second sensor signal 3 ascertaining the slope and offset of the output signal (D($\alpha$)) and accordingly configuring the evaluation electronics 4 mounting the rotation angle sensor system 1 on a first component of a vehicle, mounting the motion sensor 2 on a second component of a vehicle that is displaceable relative to the first component, positioning the vehicle in a predefined zero position, picking up and storing the output signal 5 of the rotation angle sensor system 1 and associating a zero position angle with the output signal 5 in an electrical controller.

Preferably, there are multiple mounting points available for mounting the motion sensor on the second component of the vehicle.

According to a further aspect of the invention, the object is achieved by an electrical controller that is capable of picking up the rotation angle in the area of the discontinuity from the digital output signal.

BRIEF DESCRIPTION OF THE DRAWINGS

In the drawings, in each case in a schematic illustration.

The output signal profiles of a rotation angle sensor system based on the prior art that are shown in FIG. 1a and FIG. 1b.

DETAILED DESCRIPTION OF THE PREFERRED EMBODIMENTS

Figure 2:
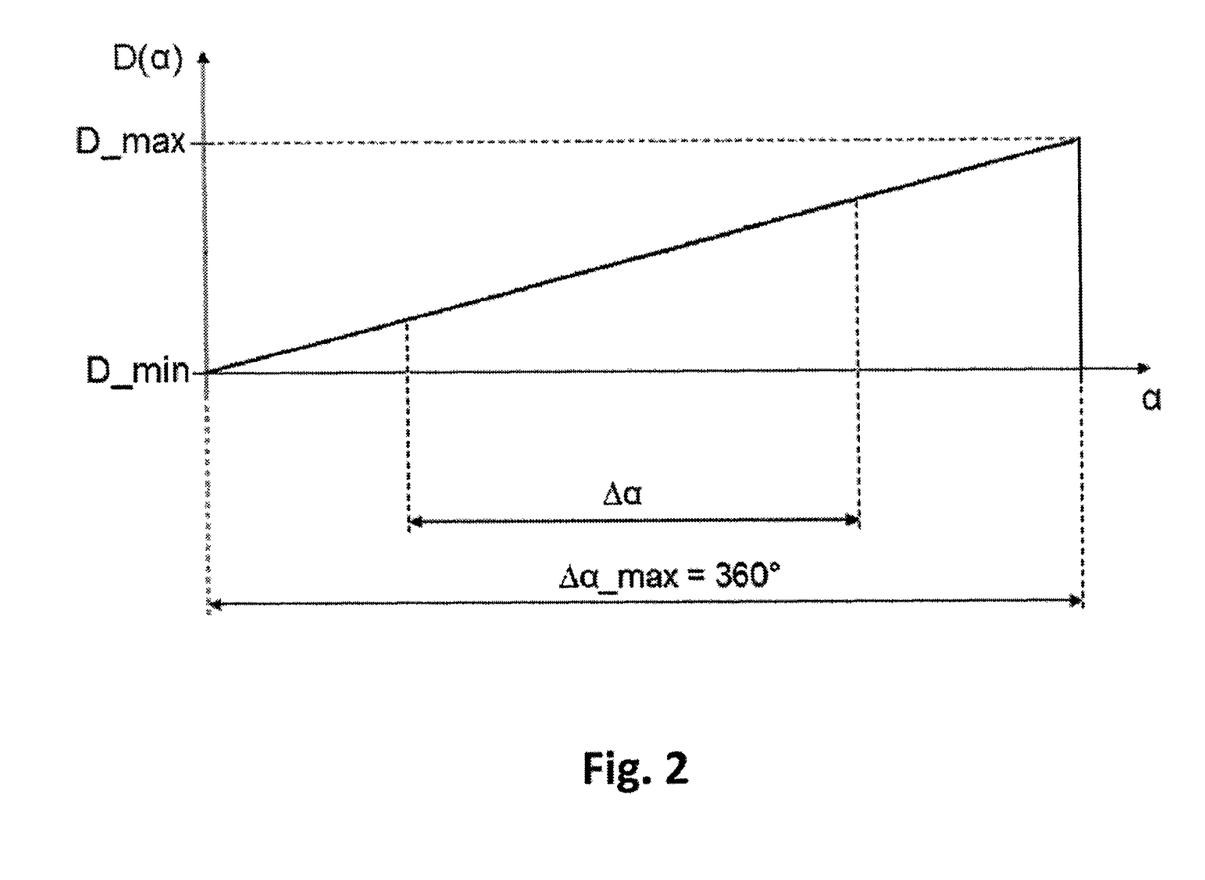
FIG. 2 shows a graph of an output signal of a rotation angle sensor system according to the invention based on a first exemplary embodiment.

In the graph shown in FIG. 2, the rotation angle α is plotted on the abscissa. The ordinate indicates the magnitude of the output signal D(α). The depicted output signal D(α) has a sawtooth-shaped profile and has a linear profile along an angle range of 360°.

Instead of multiple intervals, the range from 0° to 360° is covered by a single maximum angle interval Δα_max. This is bounded by discontinuities at its edges at 0° and 360°. Hence, as defined by the uniqueness, every angle in the maximum angle interval Δα_max has a particular associated value of the output signal D(α) and vice versa.

If a rotation angle sensor system 1 (see FIG. 5) according to the invention in a vehicle is used, by way of example, to pick up the inward and outward travel of a wheel relative to the chassis, then this movement normally results only in rotation angle changes in the motion sensor that are between 60° and 180°. Hence, the measurement angle interval Δα takes up only a portion of the maximum angle interval Δα_max.

As already in the case of the prior art described in FIGS. 1a and 1b, this exemplary embodiment also has an available internal resolution of the rotation angle sensor system that is 2^14 bits for an angle range of 360°, that is to say is 0.022° per digit. A digit in this case denotes the smallest unit of data.

The volume of data for outputting the digital output signal D(α) (See, FIG. 6 element 5) is geared to the magnitude of the measurement angle interval Δα. The resolution is in this case always 0.022° per digit, however, the resolution value of the internal resolution. This is ensured by virtue of a volume of data of, as for the internal resolution already, 2^14 bits being available for the output signal D(α) over the maximum angle interval Δα_max. The unique mapping of the rotation of the motion sensor by the output signal D(α) ensures that the whole volume of data of 2^14 bits can be used.

Since the measurement angle interval Δα is for the most part much smaller than 360°, however, a much smaller volume of data is used as a rule, however. However, the unique mapping over 360° means that there is then the possibility of expanding the measurement angle interval Δα, for example in the event of unwanted excessive deflection of the vehicle components or because this is required for a particular application.

Additionally, the measurement angle interval Δα can be shifted within the maximum angle interval Δα_max, for example if the rotation angle sensor system is installed in a different orientation, that is to say with a differently deflected motion sensor.

Figure 3:
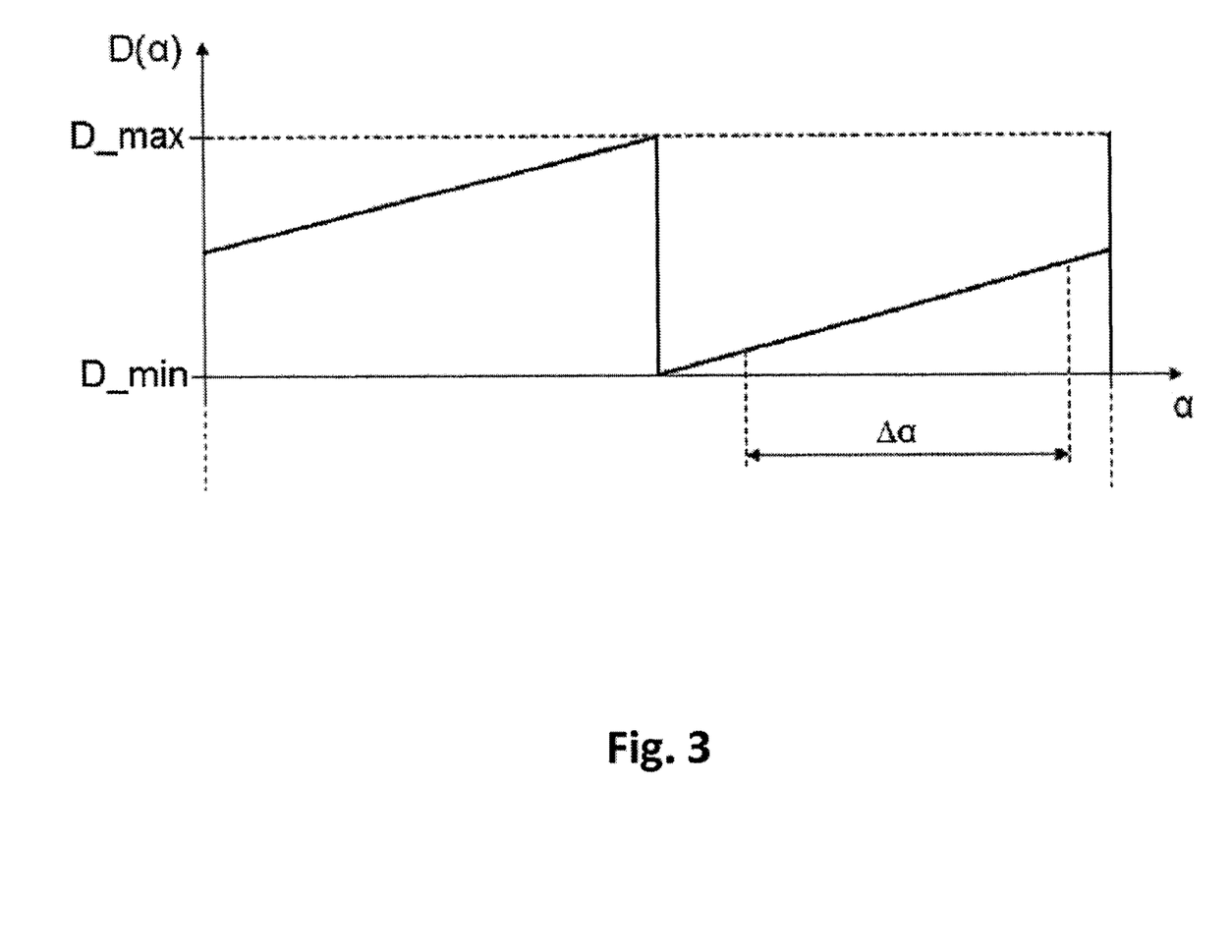
FIG. 3 shows a graph of an output signal of a rotation angle sensor system according to the invention based on a second exemplary embodiment with a discontinuity in the maximum angle interval that is outside the measurement angle interval.

In the graph of FIG. 3, it can be seen that the maximum angle interval Δα_max in this exemplary embodiment has a discontinuity. Coming from the left, the value of the output signal D(α) in this case jumps from D_max to D_min, and the other way around coming from the right.

Despite the discontinuity, the maximum angle range over 360° is defined as a unique mapping of the rotation of the motion sensor. The measurement angle interval Δα is in this case defined such that it does not include the discontinuity.

Figure 4:
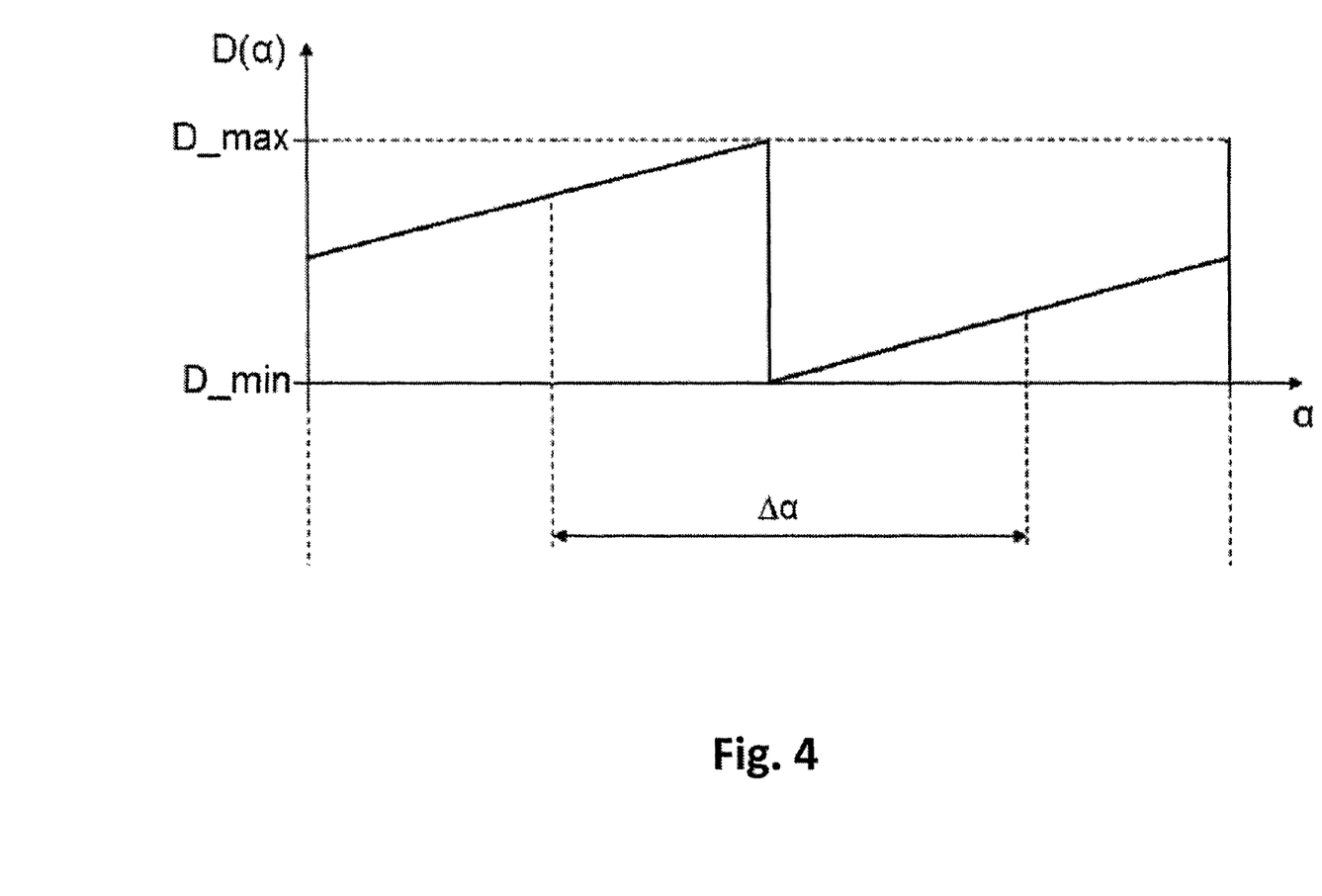
FIG. 4 shows a graph of an output signal of a rotation angle sensor system according to the invention based on a third exemplary embodiment with a discontinuity in the maximum angle interval that is within the measurement angle interval.

In the graph of FIG. 4, it can be seen that in this exemplary embodiment the measurement angle interval Δα includes the discontinuity. So that the applicable output signal D(α) can be used by an electrical controller, the latter is configured such that it can also interpret the angle information directly at the discontinuity without there being any errors.

Reference is made to FIG. 5 which shows an exemplary rotatably mounted motion sensor, and FIG. 6 which shows a block diagram of signal flow and processing of an exemplary motion sensor system.

The rotation angle sensor system 1 is calibrated in two stages. First, a basic calibration is performed in the factory. This basic calibration comprises, inter alia, the steps of:
  deflecting the motion sensor 1 through a defined first angle,
  picking up and storing a first sensor signal 3,
  deflecting the motion sensor 2 through a defined second angle,
  picking up and storing a second sensor signal 3, and
  ascertaining the slope and offset of the output signal (D(α)) and accordingly configuring and storing the slope and the offset in the evaluation electronics 4.

In a second stage, installation of the rotation angle sensor system 1 involves the following, inter alia, being performed for calibration:
  mounting the rotation angle sensor system 1 on a first component of a vehicle,
  mounting the motion sensor 2 on a second component of a vehicle that is displaceable relative to the first component,
  positioning the vehicle in a predefined zero position,
  picking up and storing the output signal 5 (D(α)) of the rotation angle sensor system and associating a zero position angle with the output signal (D(α)) in an electrical controller.

The rotation angle sensor system 1 is particularly preferably able to be used as a level sensor or the rotation angle sensor system is configured as a level sensor. The installation of level sensors may be subject to the circumstance that the installation position of the level sensors in a vehicle differ significantly from one another. Put another way, the motion sensors of the level sensors are in different orientations at the time of installation, so that the zero positions of the level sensors differ from one another. In particular if the maximum angle interval comprises 360°, it is then irrelevant where the installation position of the motion sensor is, however.

The invention claimed is:
1. A rotation angle sensor system comprising:
  a rotatably mounted motion sensor,
  a sensor that is configured to pick up a rotation of the motion sensor, the rotation being configured for a measurement angle interval, and
  evaluation electronics that are configured to receive an analog signal from the sensor and to digitise said analog signal with an internal resolution and to output a digital output signal that reproduces the rotation picked up by the sensor,
  wherein the resolution of the digital output signal for a measurement angle interval less than or equal to 360° is of the same magnitude as the internal resolution.
2. The rotation angle sensor system as claimed in claim 1, wherein the digital output signal in a maximum angle interval from 0° to 360° depicts a unique mapping of the rotation of the motion sensor.

3. The rotation angle sensor system as claimed in claim 2, wherein the measurement angle interval is within the maximum angle interval.

4. The rotation angle sensor system as claimed in claim 3, wherein the measurement angle interval comprises the middle of the maximum angle interval.

5. The rotation angle sensor system as claimed in claim 3, wherein the measurement angle interval is in the middle of the maximum angle interval.

6. The rotation angle sensor system as claimed in claim 1, wherein the output signal covers a signal range between a signal minimum and a signal maximum and, as defined by a discontinuity, skips to the signal minimum when a rotation angle associated with the signal maximum is exceeded and skips to the signal maximum when a rotation angle associated with the signal minimum is undershot.

7. The rotation angle sensor system as claimed in claim 6, wherein the maximum angle interval has one discontinuity at each of its edges only.

8. The rotation angle sensor system as claimed in claim 6, wherein the maximum angle interval has exactly one discontinuity in the area between its edges.

9. The rotation angle sensor system as claimed in claim 8, wherein the measurement angle interval is within an area without a discontinuity.

10. The rotation angle sensor system as claimed in claim 8, wherein the measurement angle interval is within an area that includes the discontinuity.

11. An electrical controller, configured to pick up a digital output signal of a rotation angle sensor system as claimed in claim 8, wherein the electrical controller is capable of picking up the rotation angle in the area of the discontinuity from the digital output signal.

12. The rotation angle sensor system as claimed in claim 1, wherein the internal resolution is at least $2^{10}$ bits over an angle of 360°.

13. The rotation angle sensor system as claimed in claim 1, wherein the measurement angle interval comprises an angle range of 90°.

14. The rotation angle sensor system as claimed in claim 1, further comprising a bracket, wherein the bracket permits mounting of the rotation angle sensor system in different alignments and/or positions on a vehicle.

15. The rotation angle sensor system as claimed in claim 1, wherein the internal resolution is at least $2^{12}$ bits over an angle of 360°.

16. The rotation angle sensor system as claimed in claim 1, wherein the internal resolution is at least $2^{14}$ bits over an angle of 360°.

17. The rotation angle sensor system as claimed in claim 1, wherein the measurement angle interval comprises an angle range of 120°.

18. The rotation angle sensor system as claimed in claim 1, wherein the measurement angle interval comprises an angle range of 180°.

\* \* \* \* \*